United States Patent Office 3,041,357
Patented June 26, 1962

3,041,357
3,4-EPOXYCYCLOHEXANECARBOXAMIDES
Benjamin Phillips and Paul S. Starcher, Charleston, W. Va., assignors to Union Carbide Corporation, a corporation of New York
No Drawing. Continuation of application Ser. No. 644,205, Mar. 6, 1957. This application Dec. 22, 1959, Ser. No. 861,200
1 Claim. (Cl. 260—348)

This invention relates to a new class of organic chemical compounds and, more particularly, to novel 3,4-epoxy-cyclohexanecarboxamides which are particularly adapted for use as stabilizers for halogen-containing vinyl-type resins and as conjunctive plasticizers for said resins.

This application is a continuation of application Serial No. 644,205 filed March 6, 1957, now abandoned, which in turn is a continuation-in-part of application Serial No. 303,152 filed August 7, 1952, now U.S. 2,785,185, issued March 12, 1957.

The 3,4-epoxycyclohexanecarboxamides of this invention are those corresponding to the general formula:

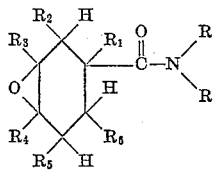

wherein $R_1$ through $R_6$ represent hydrogen or the same or different lower alkyl groups and R represents similar and dissimilar aliphatic radicals. As used herein, the term "lower alkyl" groups is intended to mean saturated, unsubstituted hydrocarbyl chains containing from one through eight carbon atoms per chain. Preferred saturated, unsubstituted, hydrocarbon chains are those containing not more than four carbon atoms per chain. Particularly preferred 3,4-epoxycyclohexanecarboxamides are those wherein the total numbers of carbon atoms in the lower alkyl groups does not exceed twelve. Typical "lower alkyl" groups include methyl, ethyl, propyl, isopropyl, butyl, isobutyl, tertiary butyl, amyl, hexyl, heptyl, octyl, isooctyl and 2-ethylhexyl groups. Also, as used herein, the term "aliphatic" is intended to include saturated and unsaturated, substituted and unsubstituted hydrocarbon chains or radicals. Typical "aliphatic" radicals include alkyl groups such as, methyl, ethyl, propyl, isopropyl, butyl, isobutyl, tertiary butyl, amyl, hexyl, heptyl, octyl, isooctyl, 2-ethylhexyl, nonyl, decyl, dodecyl, octadecyl; alkenyl groups such as, vinyl, allyl, crotyl; cyanoalkyl radicals such as, cyanoethyl, cyanopropyl; aminoalkyl radicals such as aminoethyl, aminopropyl and the like; halo alkyl radicals such as, gammachloropropyl; hydroxyalkyl radicals such as, 2-hydroxyethyl, 2-hydroxypropyl; alkoxyalkyl radicals such as, 2-ethoxyethyl, butoxyethyl, ethoxybutyl and the like; epoxy-containing cycloaliphatic hydrocarbon radicals such as, 3,4-epoxycyclohexanecarboxyl, 3,4 - epoxy-6-methylcyclohexanecarboxyl, 3,4-epoxy-1-methylcyclohexanecarboxyl radicals and the like; substituted amidoalkyl radicals such as, 3,4-epoxycyclohexanecarboxamidoalkyl radicals containing from one through eighteen carbon atoms in the alkyl group such as a 3,4-epoxycyclohexanecarboxamidoethyl radical, a 3,4-epoxycyclohexanecarboxamidopropyl radical, a 3,4-epoxy-6-methylcyclohexanecarboxamidoethyl and propyl radicals yielding N,N'-alkylene bis(3,4-epoxycyclohexanecarboxamides). This subclass of the compounds of the invention may be thought of, if desired, as the products of reaction between alkylene polyamines and an olefinically unsaturated cycloaliphatic monocarboxylic acid, and said reaction product epoxidized as hereinafter described to the corresponding polyepoxide. Illustratively, the reaction of ethylene diamine and 3-cyclohexenecarboxylic acid yields N,N'-ethylene bis(3-cyclohexenecarboxamide) which when epoxidized provides N,N'-ethylene bis(3,4-epoxycyclohexanecarboxamide). Similarly, the R's, as above-described, when taken together can be the ring skeleton residue of a polycarboxylic acid containing from 3 through 5 carbon atoms per molecule. This useful subclass of the compounds of the invention can be readily prepared by reacting the acid chloride of 3-cyclohexenecarboxylic acid with the alkali salt such as the sodium salt of an imide such as the maleimide, succinimide, glutarimide and the like.

The process for preparing the compounds of this invention is effected by reacting a 3-cyclohexenecarboxamide with peracetic acid or acetaldehyde monoperacetate at a temperature in the range of from 0° C. to 100° C. at atmospheric pressure. The 3-cyclohexenecarboxamides are preferably reacted with organic solvent solutions of peracetic acid or acetaldehyde monoperacetate. Typical solvent solutions of acetaldehyde monoperacetate or peracetic acid can be those manufactured in accordance with the processes disclosed in applications, Serial No. 303,152, filed August 7, 1952 and Serial No. 374,142, filed August 13, 1953.

In carrying out the process of this invention for preparing the 3,4-epoxycyclohexanecarboxamides employing acetaldehyde monoperacetate as the epoxidant, a typical 3-cyclohexenecarboxamide such as, for example, 3-cyclohexenecarboxamide is dissolved in ethylbenzene in a reaction vessel equipped with a column and a still head. The mixture is heated and the temperature maintained in the range of from 0° C. to 100° C. and preferably at about 70° C. Thereupon, acetaldehyde monoperacetate, usually in the form of a solution in acetone, is fed to the mixture of the amide in ethylbenzene at a uniform rate. Acetaldehyde, acetone and acetic acid are removed continuously at the still head. After removal of the low-boiling product, the product can be accepted as a residue or refined by further treatment such as by distillation.

When peracetic acid is employed as the epoxidizing agent, a typical amide such as N,N-bis(2-cyanoethyl)-3-cyclohexenecarboxamide is charged to a reaction vessel equipped with a condenser and a dropping funnel. A solution of peracetic acid in a suitable solvent is then added dropwise to the amide while the temperature is maintained in a range of from 0° C. to 100° C. and preferably at about 40° C. After the addition of the peracetic acid solution is complete, the reaction is continued for an additional period of time until an analysis for peracetic acid indicates that substantially the theoretical amount of peracetic acid has been consumed. Thereupon, the reaction mixture is removed from the reaction vessel and fed dropwise to a still kettle containing ethylbenzene as a pot-boiler under reflux and the low-boiling products removed. The N,N-bis(2-cyanoethyl) 3,4-epoxycyclohexanecarboxamide can then be accepted as a residue product if desired. The epoxyalkylimide can then be employed directly or subjected to further refinement by conventional means.

In the procedures described above 3,4-epoxycyclohexanecarboxamides are readily prepared and include 3,4-epoxycyclohexanecarboxamides such as:

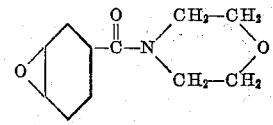

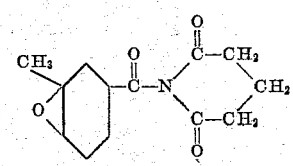
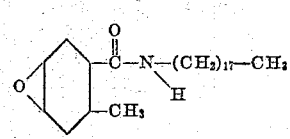
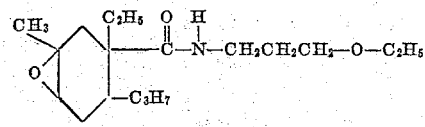
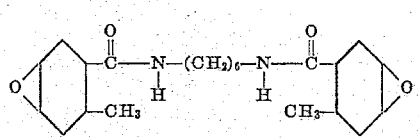
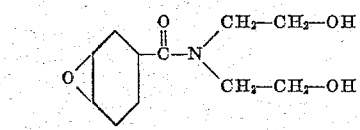
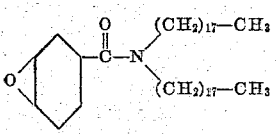
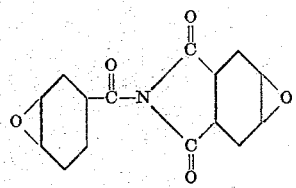
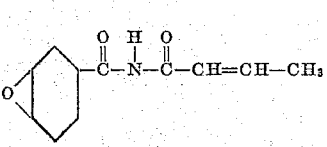
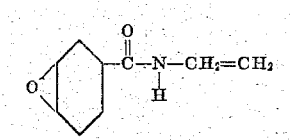
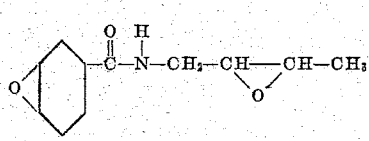
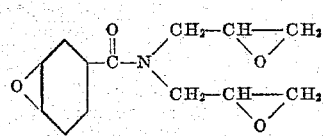
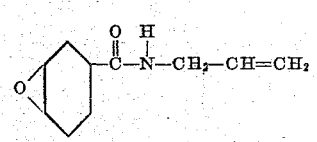

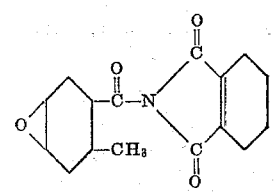
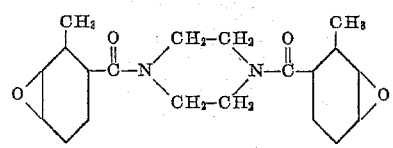
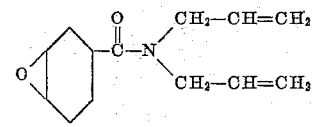
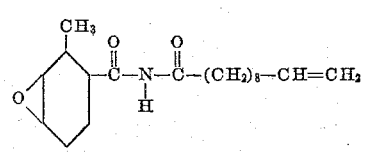
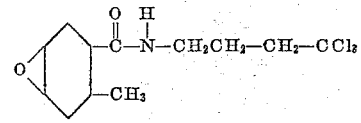
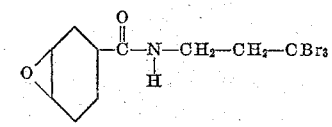

The analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

In order to determine the acetic acid content of the reaction mixtures, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate may be calculated from the previous sodium thiosulfate titration determination of epoxidizing agent content on the basis of two mols of acetic acid being formed from each mol of peracetic acid or acetaldehyde monoperacetate.

The following examples are illustrative of the practice of the invention:

EXAMPLE 1

*Preparation of 3-Cyclohexenecarboxamide*

3-cyclohexenecarboxylic acid (252 grams) and formamide (108 grams) were charged to a 24-inch column packed with glass fibers and heated to 200° C. for two hours and thirty minutes. During the heating period 23 grams of material were removed at the head as a distillate. The kettle material was allowed to cool and 290 grams of crude 3-cyclohexenecarboxamide were obtained. This was crystallized three times from acetone, and 94 grams of 3-cyclohexenecarboxamide representing a yield of 37.5 percent and having a melting point of 152° C. was obtained. Analysis: calculated for carbon 67.2 percent; hydrogen, 8.8 percent; nitrogen, 11.19 percent. Found: carbon, 66.95 percent; hydrogen, 8.68 percent; nitrogen, 11.31 percent. We believe this is a new compound.

EXAMPLE 2

*Preparation of 3,4-Epoxycyclohexanecarboxamide*

To a solution of 75 grams of 3-cyclohexenecarboxamide in 750 grams of acetone were added, over a 1.5-hour period, 332 grams of a 20.5 percent solution of peracetic acid in acetone solution at 40° C. After heating an additional 1.25 hours at 40° C., the reaction mixture was allowed to stand overnight at room temperature. Analysis for peracetic acid indicated that 98 percent of the theoretical amount had reacted. A portion of the reaction mixture (542 grams) was added dropwise to a kettle containing ethylbenzene under reflux at such pressure as to keep the kettle temperature at 50° C. The acetone, acetic acid, and some ethylbenzene were removed at the still head. The remaining ethylbenzene solution in the kettle was cooled and the white crystalline precipitate was filtered. After drying, there were obtained 29 grams of a white crystalline solid melting at 122° C. and analyzing 69 percent 3,4-epoxycyclohexanecarboxamide by the pyridine-hydrochloride method for epoxide.

EXAMPLE 3

*Preparation of N-(2-Ethylhexyl)-6-Methyl-3-Cyclohexene-1-Carboxamide*

A mixture of 400 cc. of toluene and 600 cc. of xylene was used to dissolve 280 grams of 6-methyl-3-cyclohexenecarboxylic acid, and to this solution, 258 grams of 2-ethylhexylamine were added carefully. In order to raise the reaction temperature, 400 cc. of solvent were removed on a 12-inch column packed with type 316 s.s. 0.24 x 0.24 protruded packing. The water formed (33 cc.) was removed. The product, which flash distilled, had a boiling point of 165° C. to 175° C. at 3 mm. of Hg pressure, a refractive index of 1.4789 ($n_D^{30}$).

A sample of the 430 grams of distillate, which was analyzed for unsaturation by the sodium bromide-bromine method, was found to have a purity of 100.4 percent calculated as N-2-ethylhexyl-6'-methyl-3'-cyclohexene-1'-carboxamide.

Analyses: Calculated for $C_{16}H_{29}ON$: C, 76.43 percent; H, 11.62 percent; N, 5.57 percent. Found: C, 76.75 percent; H, 11.25 percent; N, 5.55 percent.

EXAMPLE 4

*Preparation of N-(2-Ethylhexyl)-6-Methyl-3,4-Epoxycyclohexane-1-Carboxamide*

To a 500 cc. four-neck flask equipped with stirrer, thermometer, condenser and dropping funnel was charged N-(2-ethylhexyl)-6-methyl-3-cyclohexene-1 - carboxamide (73 grams). Peracetic acid in ethyl acetate (80 grams of 26.0 percent material) was added dropwise to the amide with stirring over a period of 15 minutes at 25° C. At the end of the peracetic acid addition, the reaction was continued at 25° C. for another two hours and 40 minutes, at which time a peracetic acid analysis indicated the reaction was essentially complete. Thereupon, 200 cc. of chloroform were added to the reaction mixture and washed three times with 150 cc. portions of ice-cold distilled water. The organic layer was separated and charged to a one-plate column. The column residue was reduced to 67 grams. The residue, N-2-ethylhexyl-6-methyl-3,4-epoxycyclohexane-1-carboxamide, by epoxide analysis, was 71.2 percent pure, and had a refractive index of 1.4813 ($n_D^{30}$).

EXAMPLE 5

*Preparation of N,N-Bis(2-Cyanoethyl)-3-Cyclo-Hexenecarboxamide*

To 357 grams of thionyl chloride at 50° C. were added dropwise over a period of one hour 252 grams of 3-cyclohexenecarboxylic acid. After heating under reflux for one hour, the excess thionyl chloride was removed by distillation and the residue was diluted with 300 milliliters of dry benzene. To this benzene solution were then added dropwise 246 grams of di(2-cyanoethyl) amine over a period of one hour. The reaction mixture was diluted with an additional 200 milliliters of dry benzene and heated under reflux for 24 hours at which time evolution of hydrogen chloride had substantially ceased. The solution was then washed successively with 100 milliliter portions of 10 percent NaOH, water, 10 percent HCl, saturated $NaHCO_3$, and water. The washed solution was dried over anhydrous sodium sulfate and the benzene was stripped off leaving a residue of 450 grams. The residue was recrystallized from ethanol-water mixture to yield 369 grams of crystalline solid, melting point 67.5° C.–68.5° C. Analysis: percent N=18.2, calculated for N,N-bis(2-cyanoethyl)-3- cyclohexenecarboxamide, 18.18 percent N. The yield was 80 percent of the theoretical.

EXAMPLE 6

*Preparation of N,N-Bis(2-Cyanoethyl)-3,4-Epoxy-Cyclohexanecarboxamide*

To a solution of N,N-bis(2-cyanoethyl)-3-cyclohexenecarboxamide (100 grams) in ethylbenzene (300 grams) were added, over a 40-minute period, 230 grams of a 21.5 percent solution of peracetic acid in acetone at a temperature of 40° C. After an additional one-hour reaction period at 40° C., an analysis for peracetic acid indicated that the reaction was complete. The reaction mixture was charged to a still and the acetone, acetic acid, and some of the ethylbenzene were removed under reduced pressure. At this point, the product separated out as the lower layer in the kettle. The layers were cooled and separated. The product layer (139 grams) was separated and analyzed for epoxide by the hydrogen bromide method and was found to contain 78.5 percent N,N-bis(2-cyanoethyl)-3,4-epoxycyclohexanecarboxamide. The yield was, therefore, practically quantitative. The remaining ethylbenzene in the product layer was removed by stripping under 2-3 mm. pressure at 100° C. The product was a brown, viscous liquid.

EXAMPLE 7

*A Vinyl Chloride Resin Plasticized With a Blend of Dioctyl Phthalate and N-2-Ethylhexyl 3,4-Epoxy-6-Methyl-Cyclohexanecarboxamide as Combination Plasticizers*

A recipe was prepared comprising polyvinyl chloride and N-2-ethylhexyl 3,4-epoxy-6-methylcyclohexanecarboxamide and 0.5 percent by weight of dibutyl tin maleate as a stabilizer. The amount of epoxide employed comprised 69.0 parts per 100 parts of polyvinyl chloride. The composition was milled at 158° C., whereupon the plasticized composition was N-2-ethylhexyl 3,4-epoxy-6-methylcyclohexanecarboxamide. The plasticized composition was tested and had the following properties:

| | |
|---|---|
| Plasticizer, parts per hundred parts of resin | 69 |
| Plasticizer, percent | 41.0 |
| Tensile, p.s.i. (24.5° C.) | 2,300 |
| Elongation, percent (24.5° C.) | 325 |
| Load at 100% elong., p.s.i. (24.5° C.) | 1,590 |
| ASTM stiffness modulus, p.s.i. (24.5° C.) | 3,120 |
| $T_F$, ° C | −15 |
| $T_4$, ° C | 12 |
| Brittle temperature, ° C | −14 |
| Percent Extraction: | |
|    Oil, 10 days at 25° C | 10.4 |
|    Water, 10 days at 25° C | 11.6 |
| Durometer "A" hardness (24.5° C.) | 81 |
| SPI volatile loss, percent in 24 hrs. at 70° C | -- |
| Heat-stability data: | |
|    Initial color, percent BLR | 77 |
|    Min. at 158° C. to 80% BLR | -- |
|    Min. at 158° C. to 75% BLR | 2 |
|    Min. at 158° C. to 60% BLR | 11 |
|    Min. at 158° C. to 15% BLR | 109 |
| Sweatout | Slight |

As may be observed, N-2-ethylhexyl 3,4-epoxy-6-methylcyclohexanecarboxamide exhibits a plasticizing action for polyvinyl chloride.

In reporting the above-described physical properties of the plasticized composition, certain symbols and abbreviations are employed for the sake of brevity and clarity. These symbols and abbreviations are defined as follows:

(*a*) ASTM=American Society of Testing Materials (*b*) $T_F$ and $T_4$=Points corresponding to 135,000 and 10,000 pounds per square inch respectively on a stiffness-temperature curve obtained in accordance with the procedure set forth in the manual of ASTM D1043-51.

(*c*) Brittle temperature=The temperature obtained by means of low temperature impact test according to the procedure set forth in the manual of ASTM D746-52T.

(*d*) SPI volatility loss=Valve obtained in accordance with the procedure in the manual of ASTM D1203-52T.

(*e*) Durometer "A" hardness=An indentation measurement of hardness obtained with the Shore Durometer "A" head.

(*f*) Sweatout=Visual and manual examinations to detect any exudation of plasticizer that may appear as beads, a smear or a blush on the surface of the plasticized material. The observation is made after two weeks of aging at 25° C.

Insofar as possible, the effectiveness of the plasticizer is described as the percent of plasticizer necessary to obtain a tensile modulus of 1000 pounds per square inch at 100 percent elongation, at a test temperature of 24.5° C., with the above-described resin.

What is claimed is:
3,4-epoxycyclohexanecarboxamide.

References Cited in the file of this patent
UNITED STATES PATENTS

| | | |
|---|---|---|
| 2,765,296 | Strain | Oct. 2, 1956 |
| 2,794,812 | Phillips et al. | June 4, 1957 |

FOREIGN PATENTS

| | | |
|---|---|---|
| 541,032 | Belgium | Sept. 20, 1955 |